United States Patent
Huppi

(10) Patent No.: US 7,084,856 B2
(45) Date of Patent: Aug. 1, 2006

(54) MOUSE HAVING A ROTARY DIAL

(75) Inventor: Brian Huppi, San Carlos, CA (US)

(73) Assignee: Apple Computer, Inc., Cupertino, CA (US)

( * ) Notice: Subject to any disclaimer, the term of this patent is extended or adjusted under 35 U.S.C. 154(b) by 118 days.

(21) Appl. No.: 10/072,765

(22) Filed: Feb. 7, 2002

(65) Prior Publication Data

US 2003/0076303 A1    Apr. 24, 2003

Related U.S. Application Data

(60) Provisional application No. 60/345,325, filed on Oct. 22, 2001, provisional application No. 60/346,237, filed on Oct. 22, 2001.

(51) Int. Cl.
 *G09G 5/08* (2006.01)
(52) U.S. Cl. ........................ 345/163; 345/156
(58) Field of Classification Search ........ 345/156–157, 345/163–169; 341/20, 35, 25; 463/37; D14/402; 200/179, 11 TW, 11 R, 11 D
 See application file for complete search history.

(56) References Cited

U.S. PATENT DOCUMENTS

| | | | |
|---|---|---|---|
| 4,110,749 A | 8/1978 | Janko et al. | |
| 4,719,524 A | 1/1988 | Morishima et al. | |
| 4,736,191 A | 4/1988 | Matzke et al. | |
| 4,866,602 A | 9/1989 | Hall | |
| 4,917,516 A | 4/1990 | Retter | |
| 5,125,077 A | 6/1992 | Hall | |
| 5,179,648 A | 1/1993 | Hauck | |
| 5,186,646 A | 2/1993 | Pederson | |
| 5,237,311 A | 8/1993 | Mailey et al. | |
| D349,280 S | 8/1994 | Kaneko | |
| 5,339,213 A | 8/1994 | O'Callaghan | |
| 5,404,152 A | 4/1995 | Nagai | |
| 5,414,445 A | 5/1995 | Kaneko et al. | |
| 5,438,331 A * | 8/1995 | Gilligan et al. | ............... 341/35 |
| D362,431 S | 9/1995 | Kaneko et al. | |
| 5,473,343 A | 12/1995 | Kimmich et al. | |
| 5,473,344 A | 12/1995 | Bacon et al. | |
| 5,495,566 A | 2/1996 | Kwatinetz | |
| 5,528,265 A | 6/1996 | Harrison | |
| 5,559,943 A | 9/1996 | Cyr et al. | |
| 5,565,887 A | 10/1996 | McCambridge et al. | |
| 5,578,817 A | 11/1996 | Bidiville et al. | |
| 5,585,823 A | 12/1996 | Duchon et al. | |
| 5,596,347 A | 1/1997 | Robertson et al. | |
| 5,598,183 A | 1/1997 | Robertson et al. | |

(Continued)

FOREIGN PATENT DOCUMENTS

EP    0 498 540    1/1992

(Continued)

OTHER PUBLICATIONS

"System Service and Troubleshooting Manual", www.dsplib.com/intv/Master, downloaded Dec. 11, 2002.

(Continued)

*Primary Examiner*—Ricardo Osorio
(74) *Attorney, Agent, or Firm*—Beyer Weaver & Thomas, LLP

(57) ABSTRACT

A user operated input device is disclosed. The user operated input device includes a housing and a rotary dial positioned relative to an external surface of the housing. The rotary dial provides a control function.

48 Claims, 6 Drawing Sheets

U.S. PATENT DOCUMENTS

| | | |
|---|---|---|
| 5,611,040 A | 3/1997 | Brewer et al. |
| 5,611,060 A | 3/1997 | Belfiore et al. |
| D382,550 S | 8/1997 | Kaneko et al. |
| D385,542 S | 10/1997 | Kaneko et al. |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,786,818 A | 7/1998 | Brewer et al. |
| 5,808,602 A * | 9/1998 | Sellers ................. 345/157 |
| 5,825,353 A | 10/1998 | Will |
| 5,828,364 A | 10/1998 | Siddiqui |
| 5,838,304 A | 11/1998 | Hall |
| D402,281 S | 12/1998 | Ledbetter et al. |
| 5,850,213 A * | 12/1998 | Imai et al. .................. 428/1.55 |
| 5,856,822 A | 1/1999 | Du et al. |
| 5,883,619 A * | 3/1999 | Ho et al. ................. 345/163 |
| 5,889,236 A | 3/1999 | Gillespie et al. |
| 5,903,229 A | 5/1999 | Kishi |
| 5,907,152 A | 5/1999 | Dandliker et al. |
| 5,907,318 A | 5/1999 | Medina |
| 5,909,211 A | 6/1999 | Combs et al. |
| 5,914,706 A | 6/1999 | Kono |
| 5,956,019 A | 9/1999 | Bang et al. |
| 5,959,611 A * | 9/1999 | Smailagic et al. .......... 345/156 |
| 6,002,389 A | 12/1999 | Kasser |
| 6,005,299 A * | 12/1999 | Hengst .................. 307/10.1 |
| 6,031,518 A | 2/2000 | Adams et al. |
| 6,064,370 A | 5/2000 | Wang et al. |
| 6,075,533 A | 6/2000 | Chang |
| 6,084,574 A | 7/2000 | Bidiville |
| 6,097,372 A * | 8/2000 | Suzuki .................. 345/167 |
| 6,115,028 A | 9/2000 | Balakrishnan et al. |
| 6,124,587 A | 9/2000 | Bidiville et al. |
| 6,128,006 A * | 10/2000 | Rosenberg et al. ......... 345/163 |
| 6,130,664 A | 10/2000 | Suzuki |
| 6,163,312 A | 12/2000 | Furuya |
| 6,166,721 A | 12/2000 | Kuroiwa et al. |
| 6,179,496 B1 * | 1/2001 | Chou .................. 400/472 |
| 6,181,322 B1 | 1/2001 | Nanavati |
| 6,188,393 B1 | 2/2001 | Shu |
| 6,191,774 B1 | 2/2001 | Schena et al. |
| 6,198,473 B1 | 3/2001 | Armstrong |
| 6,211,861 B1 | 4/2001 | Rosenberg et al. |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| D443,616 S | 6/2001 | Fisher et al. |
| 6,243,078 B1 | 6/2001 | Rosenberg |
| 6,262,717 B1 | 7/2001 | Donohue et al. |
| 6,266,050 B1 | 7/2001 | Oh et al. |
| 6,297,795 B1 | 10/2001 | Kato et al. |
| 6,323,845 B1 | 11/2001 | Robbins |
| 6,333,734 B1 | 12/2001 | Rein |
| 6,340,800 B1 | 1/2002 | Zhai et al. |
| 6,369,797 B1 | 4/2002 | Maynard, Jr. |
| 6,373,470 B1 * | 4/2002 | Andre et al. ................. 345/166 |
| 6,377,530 B1 | 4/2002 | Burrows |
| 6,392,634 B1 | 5/2002 | Bowers et al. |
| 6,429,852 B1 * | 8/2002 | Adams et al. .............. 345/163 |
| 6,587,091 B1 * | 7/2003 | Serpa ................. 345/156 |
| 6,636,197 B1 * | 10/2003 | Goldenberg et al. ........ 345/156 |
| 6,677,927 B1 | 1/2004 | Bruck et al. |
| 6,686,904 B1 | 2/2004 | Sherman et al. |
| 6,703,550 B1 * | 3/2004 | Chu .................. 84/609 |
| 6,724,817 B1 | 4/2004 | Simpson et al. |
| 6,727,889 B1 | 4/2004 | Shaw |
| 6,738,045 B1 | 5/2004 | Hinckley et al. |
| 6,791,533 B1 * | 9/2004 | Su .............. 345/163 |
| 6,795,057 B1 * | 9/2004 | Gordon ................. 345/163 |
| 6,828,958 B1 | 12/2004 | Davenport |
| 6,844,871 B1 | 1/2005 | Hinckley et al. |
| 6,844,872 B1 * | 1/2005 | Farag et al. ................. 345/163 |
| 2001/0011991 A1 | 8/2001 | Wang et al. |
| 2001/0043545 A1 | 11/2001 | Aratani |
| 2001/0050673 A1 * | 12/2001 | Davenport .................. 345/163 |
| 2002/0030665 A1 * | 3/2002 | Ano ................. 345/168 |
| 2002/0033848 A1 | 3/2002 | Sciammarella et al. |
| 2002/0118169 A1 | 8/2002 | Hinckley et al. |
| 2002/0154090 A1 * | 10/2002 | Lin .................. 345/156 |
| 2002/0158844 A1 * | 10/2002 | McLoone et al. ........... 345/163 |
| 2002/0164156 A1 | 11/2002 | Bilbrey |
| 2002/0180701 A1 * | 12/2002 | Hayama et al. ............. 345/163 |
| 2003/0043121 A1 * | 3/2003 | Chen .................. 345/169 |
| 2003/0050092 A1 | 3/2003 | Yun |
| 2003/0076301 A1 | 4/2003 | Tsuk et al. |
| 2003/0076306 A1 | 4/2003 | Zadesky et al. |
| 2003/0095096 A1 | 5/2003 | Robbin et al. |
| 2003/0098851 A1 * | 5/2003 | Brink .................. 345/163 |
| 2003/0107551 A1 | 6/2003 | Dunker |
| 2003/0107552 A1 | 6/2003 | Lu |
| 2003/0184517 A1 | 10/2003 | Senzui et al. |
| 2004/0239622 A1 | 12/2004 | Proctor et al. |
| 2004/0252109 A1 | 12/2004 | Trent, Jr. et al. |

FOREIGN PATENT DOCUMENTS

| | | |
|---|---|---|
| EP | 0 880 091 | 11/1998 |
| EP | 1 026 713 | 8/2000 |
| JP | 363106826 A * | 5/1988 |
| JP | 03-237520 | 10/1991 |
| JP | 410326149 A * | 12/1998 |
| JP | 11-194863 | 7/1999 |
| JP | 11-194872 | 7/1999 |
| JP | 11-194883 | 7/1999 |
| JP | 2000-215549 | 8/2000 |
| JP | 2001-051790 | 2/2001 |
| JP | 2003280807 | 10/2003 |
| TW | 431607 | 4/2001 |
| WO | 94/17494 | 8/1994 |
| WO | 98/14863 | 4/1998 |
| WO | WO 99/49443 * | 9/1999 |

OTHER PUBLICATIONS

"BeoCom 6000 User Guide 2000", Bang & Olufsen Telecom.

"About Quicktip®" www.logicad3d.com/docs/qt.html, downloaded Apr. 8, 2002.

"Neuros MP3 Digital Audio Computer", www.neurosaudio.com., downloaded Apr. 9, 2003.

"OEM Touchpad Modules" website www.glidepoint.com/sales/modules.index/shtml, downloaded Feb. 13, 2002.

"Product Overview—ErgoCommander®", www.logicad3d.com/products/ErgoCommander.htm, downloaded Apr. 8, 2002.

"Product Overview—SpaceMouse® Classic", www.logicad3d.com/products/Classic.htm, downloaded Apr. 8, 2002.

"Synaptics Tough Pad Interfacing Guide" Second Edition, Mar. 25, 1998, Synaptics, Inc. San Jose, CA, pp. 1 to 90.

Bang & Olufsen Telecom a/s, "BeoCom 6000 User Guide 2000.".

Chapweske, Adam, "PS/2 Mouse/Keyboard Protocol", 1999, http://panda.cs.ndsu.nodak.edu/~achapwes/PICmicro/PS2/ps2.htm.

Fiore, Andrew, "Zen Touchpad", Cornell University, May 2000.

Gadgetboy, "Point and click with the latest mice", CNET Asia Product Review, www.asia.cnet.com/reviews...are/gadgetboy/0,39001770,38023590,00.htm, downloaded Dec. 5, 2001.

Sylvania, "Intellivision™ Intelligent Television Master Component Service Manual," pp. 1, 2 and 8, 1979.

Tessler et al. "Touchpads Three new input devices", website www.macworld.com/1996/02/review/1806.html, downloaded Feb. 13, 2002.

"Der Klangmeister," Connect Magazine, Aug. 1998.

Photographs of Innovations 2000 Best of Show award presented at the 2000 International CES Innovations 2000 Design & Engineering Showcase, 1pg.

BeoCom 6000, Sales Training Brochure, date unknown.

"System Service and Troubleshooting Manual", www.dsplib.com/intv/Master, downloaded Dec. 11, 2002.

Kevin De Meyer, Crystal Optical Mouse, Feb. 14, 2002, Heatseekerz, Web Article 19.

Letter re: Bang & Olufsen A/S, by David Safran, Nixon Peabody, LLP, May 21, 2004.

* cited by examiner

MOUSE HAVING A ROTARY DIAL

CROSS REFERENCE TO RELATED APPLICATION

This application claims the benefit of U.S. Provisional Application No. 60/345,325, filed on Oct. 22, 2001, entitled "Mouse Having a Scrolling Feature", in which the disclosure is incorporated herein by reference. This application is also related to U.S. Patent Application No. 60/346,237, entitled "Method and System for List Scrolling", filed on even date and which is incorporated herein by reference.

BACKGROUND OF THE INVENTION

1. Field of the Invention

The present invention relates generally to a mouse for use in a computer system. More particularly, the present invention relates to scrolling features for a mouse.

2. Description of the Related Art

Most computer systems, as for example general purpose computers such as portable computers and desktop computers, receive input from a user via an input device such as a mouse. As is generally well known, the mouse allows a user to move an input pointer and to make selections in a graphical user interface (GUI). The mouse generally includes a trackball, which is located on the underside of the mouse and which rolls when the mouse moves thus translating the motion of the users hand into signals that the computer system can use. The movement of the trackball generally corresponds to the movement of the input pointer in the GUI. That is, by positioning the mouse on a desktop and moving it thereon, the user can move the input pointer in similar directions in the GUI. The mouse also includes one or two buttons, which are located on the top side of the mouse, and which have a click movement that actuates a GUI action such as selecting a file or executing instructions. Recently, a scroll wheel has been added to the mouse to give the user scrolling functionality. The scroll wheel saves time and steps, and allows a user to move through documents by simply rolling the wheel forward or backward-instead of clicking on the scroll bar displayed on the GUI. In the past, scrolling was implemented by selecting the scroll bar displayed on the GUI with the mouse, and moving the scroll bar on the GUI by moving the mouse up or down.

FIG. 1 is a perspective diagram of a well known mouse 10. The mouse 10 generally includes a base 12, an upper body 14, a left button 16, a right button 18, and a scroll wheel 20. The base 12 carries the above components as well as a trackball or other device such as an optical sensor (not shown) for tracking the movement of the base 12 relative to a surface 22. The upper body 14 is rigidly attached to the base 12. The left and right buttons 16, 18 independently pivot relative to the upper body 14 in a direction towards the base 12 so as to activate the button functionality. The scroll wheel 20 rotates relative to the base 12 so as to activate the scrolling functionality. As shown, a small portion of the scroll wheel 20 protrudes above a top surface of the mouse 10 in order to allow a user to roll the scroll wheel 20 forwards towards a front of the mouse 10 and backwards towards the rear of the mouse 10. By moving the scroll wheel forwards and backwards, the user can vertically scroll upwards or downwards through the GUI.

Unfortunately, the mouse described in FIG. 1 has several drawbacks. For example, the scroll wheel is limited in that it only provides a single finger position for accessing the scroll wheel (e.g., same position for left and right handed users). Furthermore, because only a small portion of the wheel can be used at any one time, the user cannot continuously turn the wheel. That is, the user must scroll, pick up a finger, scroll, pick up a finger, etc. This takes time and can be an annoyance to a user. In addition, because a portion of the wheel protrudes above the top surface of the mouse, inadvertent or accidental scrolling may occur when one of the two buttons is activated. That is, when the user goes to push the button or when the user switches from one button to the other, the user's finger may also engage the scroll wheel thus causing the wheel to turn when the button is depressed. Moreover, because the scroll wheel can only be manipulated in one direction, the use of the scroll wheel becomes counter intuitive when scrolling in a different direction in the GUI, as for example directions that are orthogonal thereto. That is, the scroll wheel only moves in one direction and thus it generally corresponds well to vertical scrolling and not horizontal scrolling (or vice versa). Also, the protruding scroll wheel is not aesthetically pleasing and thus it presents industrial design difficulties.

Thus, it would be desirable to provide improved scrolling features for a mouse.

SUMMARY OF THE INVENTION

The invention relates, in one embodiment, to a user operated input device comprising a housing and a rotary dial positioned relative to an external surface of the housing, the rotatable dial providing a control function.

The invention relates, in another embodiment, to a computer mouse for moving a cursor or pointer on a display screen. The computer mouse includes a mouse housing. The computer mouse also includes a disk coupled to the mouse housing and rotatable about an axis. The disk is configured to facilitate a control function on the display screen. The disk has a touchable surface for rotating the disk about the axis. The touchable surface is completely accessible to a finger of the user such that the disk can be continuously rotated by a simple swirling motion of the finger.

The invention relates, in another embodiment, to a computer mouse. The computer mouse includes a body moveable by a user. The computer mouse also includes a disk rotatably coupled to the body about an axis, and having a surface for facilitating movements thereof. The surface is positioned substantially orthogonal to the axis. The computer mouse further includes an encoder for measuring the rotation of the disk.

DESCRIPTION OF THE DRAWINGS

The invention will be readily understood by the following detailed description in conjunction with the accompanying drawings, wherein like reference numerals designate like structural elements, and in which.

DESCRIPTION OF THE INVENTION

Embodiments of the invention are discussed below with reference to FIGS. 2–10. However, those skilled in the art will readily appreciate that the detailed description given herein with respect to these figures is for explanatory purposes as the invention extends beyond these limited embodiments.

Figure 2:
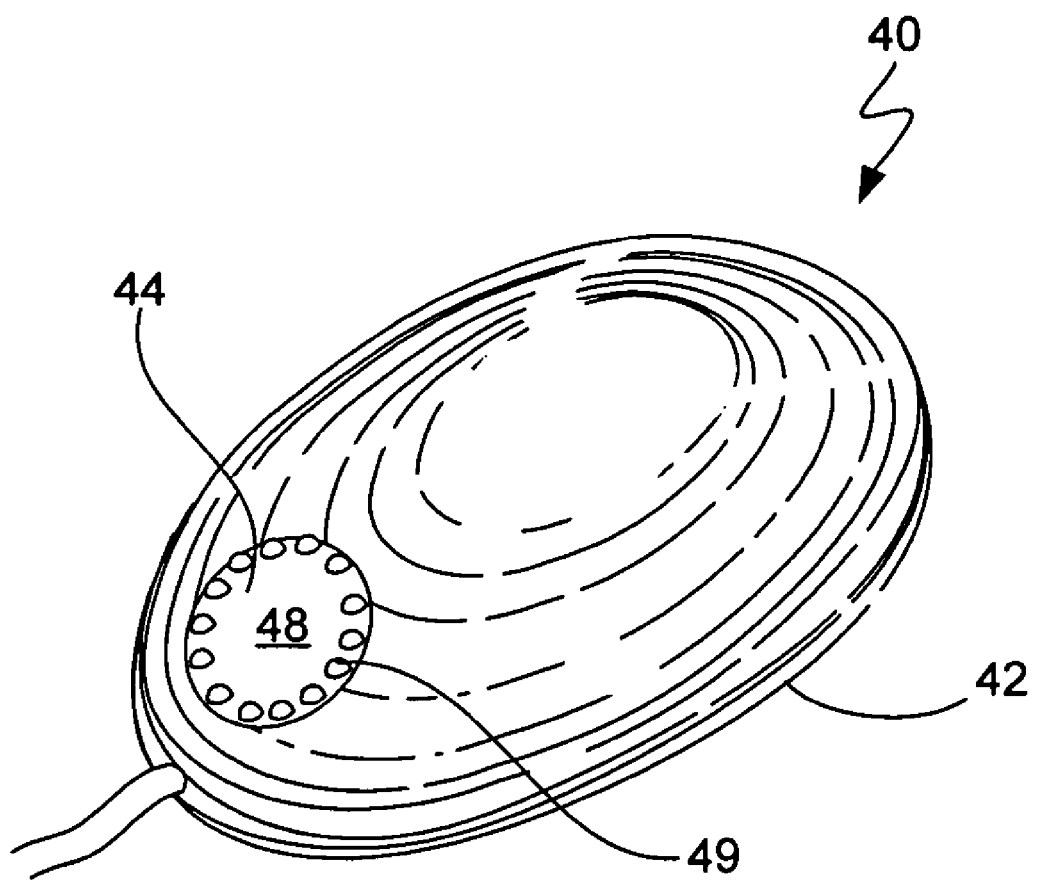
FIG. 2 is a perspective diagram of a mouse, in accordance with one embodiment of the present invention.

FIG. 2 is a perspective diagram of a mouse 40, in accordance with one embodiment of the invention. The mouse 40 is a user operated input device for moving a cursor or pointer on a display screen. By way of example, the input pointer may be displayed via a Graphical User Interface (GUI) on a display screen. In general, the mouse 40 is configured to provide positional information, which corresponds to the movement of the mouse along a surface, to a computer system that includes the display screen. The positional information is used by the computer system to move the cursor or pointer on the display screen of the display monitor. For example, when the mouse is moved forward, the cursor is moved vertically up on the screen. By way of example, the computer system may correspond to a general purpose computer such as a desktop computer or a portable computer.

The mouse 40 includes a mouse housing 42 and a rotary dial 44. The mouse housing 40 provides a structure for moving the mouse along a surface and for gripping the mouse 40 for movement thereof. The mouse housing 42 is also configured to enclose and support the internal components of the mouse 40. For example, the mouse housing 42 may contain the electronics that generate positional information associated with moving the input pointer on the display screen. The mouse housing generally defines the shape or form of the mouse 40. That is, the contour of the mouse housing 42 may embody the outward physical appearance of the mouse 40.

The rotary dial 44, on the other hand, is configured to provide a control function (or functions) for performing an action (or actions) on a display screen. In general, the rotary dial 44 is arranged to rotate around an axis in order to implement the control function. The control function may be implemented incrementally or continuously during rotation of the rotary dial. The control function may be widely varied. For example, the control function may be used to control various applications associated with the computer system to which the mouse is connected.

In one embodiment, the control function corresponds to a scrolling feature. The term "scrolling" as used herein generally pertains to moving displayed data or images (e.g., text or graphics) across a viewing area on a display screen so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen or it may only be a portion of the display screen (e.g., a window frame).

The direction of scrolling may be widely varied. For example, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area. In one implementation, the scrolling feature may be used to move a Graphical User Interface (GUI) vertically (up and down), or horizontally (left and right) in order to bring more data into view on a display screen. By way of example, the scrolling feature may be used to help perform internet browsing, spreadsheet manipulation, viewing code, computer aided design, and the like. The direction that the dial rotates may be arranged to control the direction of scrolling. For example, the dial may be arranged to move the GUI vertically up when rotated counterclockwise, and vertically down when the rotated clockwise (or vice versa).

Figure 1:
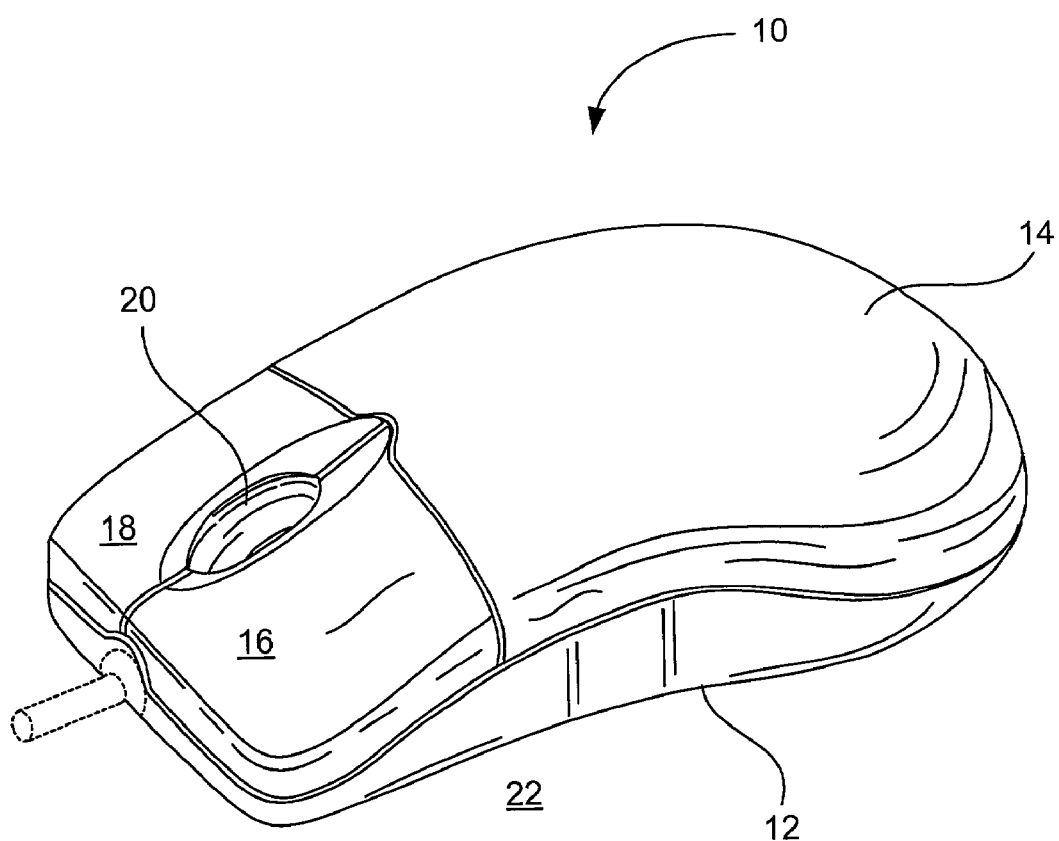
FIG. 1 is a perspective diagram of an exemplary mouse.

The rotary dial 44 generally includes a circular face 48, which is engageable to a user during manipulation thereof. In the illustrated embodiment, the engageable face 48 is completely exposed to the user, i.e., the engageable face 48 is not covered by any portion of the mouse housing 42. As such, the rotary dial 44 can be continuously rotated by a simple swirling motion of a finger, i.e., the disc can be rotated through 360 degrees of rotation without stopping. Furthermore, the user can rotate the rotary dial 44 tangentially from all sides thus giving it more range of finger positions than that of a traditional scroll wheel as shown in FIG. 1. For example, when the mouse 40 is being held, a left handed user may choose to use one portion of the disc while a right handed user may choose to use another portion of the disc.

The position of the dial relative to the mouse housing may be widely varied. For example, the scroll dial may be placed at any external surface (e.g., top, side, front, or back) of the mouse housing 42 that is accessible to a user during manipulation of the mouse 40. In one embodiment, the plane of rotation created by the rotating dial is substantially parallel to at least a portion of the external surface of the mouse housing on (or in) which the rotary dial is positioned. For example, as shown, the rotary dial may be positioned at a top front surface of the mouse housing, and thus the plane of rotation may be substantially parallel to the top front surface of the mouse housing.

Furthermore, the rotary dial may be positioned inside or outside the external surface of the mouse housing. For example, the rotary dial may be recessed below, level with, or extend above the surface of the mouse housing. In the illustrated embodiment, the engageable face 48 of the rotary dial 44 is substantially flush with the external surface of the mouse housing. As such, the rotary dial does not protrude out of the mouse thus reducing the amount of accidental scrolling while making the mouse more aesthetically pleasing. The rotary dial 44 may also include tactile features 49, which provide tangible surfaces that help the user manipulate the rotary dial and that inform the user of its rotatable position during rotation thereof. By way of example, the tactile features may be bumps or voids located in the engageable face 48.

Figure 3:
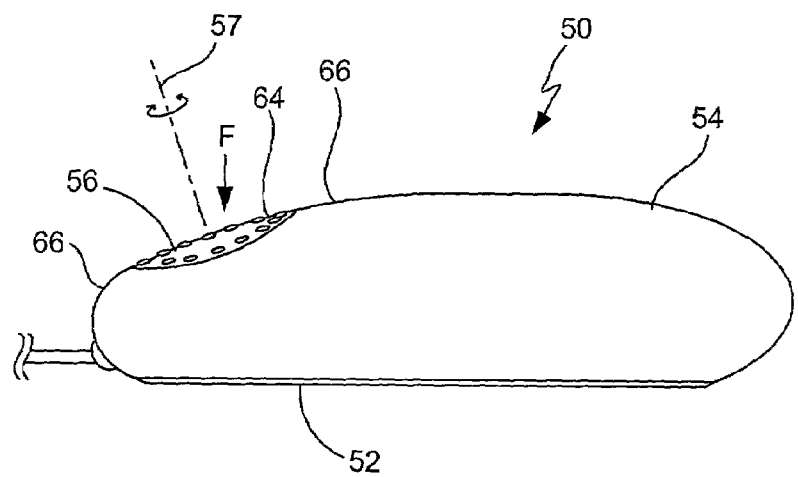
FIG. 3 is a side view of a mouse, in accordance with one embodiment of the present invention.
Figure 4:
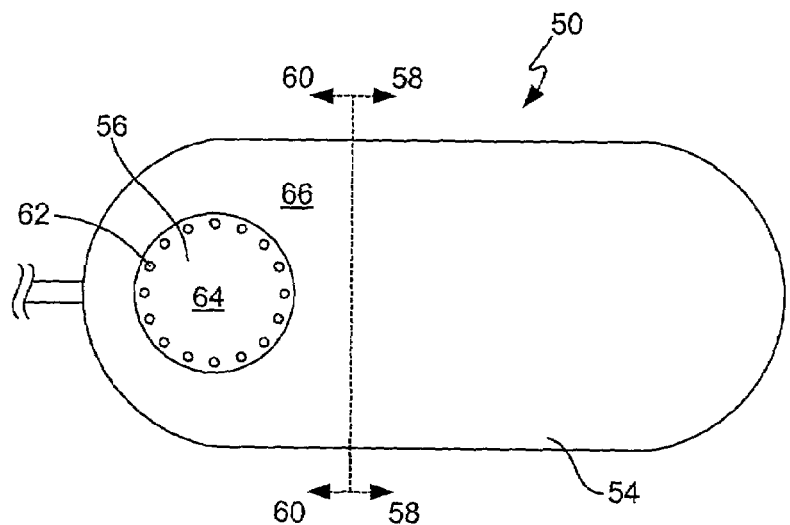
FIG. 4 is a top view of a mouse, in accordance with one embodiment of the present invention.

FIGS. 3 and 4 are side and top views, respectively, of a mouse 50, in accordance with one embodiment of the invention. By way of example, the mouse 50 may generally correspond to the mouse 40 shown in FIG. 2. The mouse 50 generally includes a movable base 52, a button body 54 and a rotatable disc 56. The movable base 52 is configured to moveably support the mouse 50 on a flat surface (i.e., desktop or mouse pad) so that a user can move an input pointer in a graphical user interface (GUI). In one embodiment, the movable base 52 operatively supports a position detecting mechanism therein so as to track the position of the mouse as it is moved along the flat surface. By way of example the position detecting mechanism may be a trackball mechanism or an optical sensor. The position detecting mechanism is generally configured to provide information to a computer so that the movement of the pointer on the screen corresponds to the movement of the mouse on the flat surface, i.e., when the mouse moves forward, the cursor moves vertically up on the screen.

Figure 5:
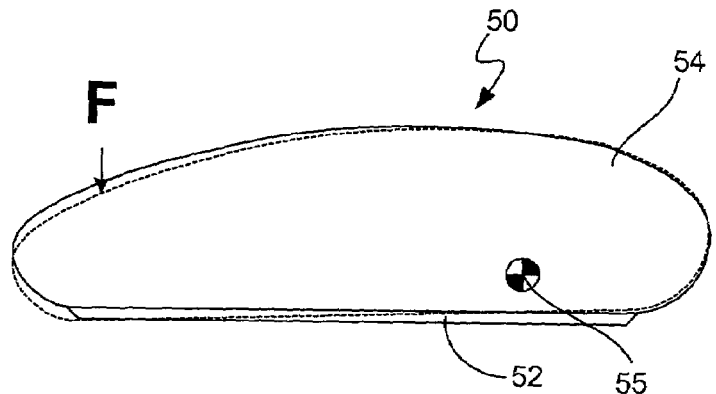
FIG. 5 is a side view of a mouse with a click action body, in accordance with one embodiment of the present invention.

In one embodiment, the button body 54 is configured to provide a clicking action for the mouse so that a user can perform an action on a display screen, as for example, making a selection in a GUI. The button body 54 may be pivotable relative to the base 52. For example, as shown in FIG. 5, the button body 54 may pivot around a pivot axis 55. As such, the body 54 may be pushed down towards the base 52 via a force F in order to generate the clicking action. The force F may be any downward force on the mouse 50, whether from a finger, palm or hand that results in a clicking action.

The clicking action may be used to implement a single click, a double click and/or a dragging and dropping function. As is generally well known, a single click often selects an item on the screen, a double click often opens a document or starts a program, and dragging and dropping generally makes it easy to move an item on the screen. In order to perform a single click using the mouse 50, the user presses and releases the body 54. In order to perform a double click using the mouse 50, the user quickly presses and releases the body 54 twice. In order to perform a drag and drop function, the user first positions the pointer or cursor over an item on the screen (by moving the mouse along the flat surface) and presses and holds down the body 54 so as to select the item. Thereafter, the user, while still holding down the body 54, moves the pointer to a desired position on the screen (by moving the mouse along the flat surface) and subsequently releases the body 54.

In most cases, the movable base 52 and button body 54 provide a mouse housing for containing the electronics that generate control signals associated with moving the input pointer, making selections and scrolling. By way of example, the electronics may be printed circuit boards (PCB), processors, encoders, switches, wires, and the like. The base 52 and body 54 may also define the shape or form of the mouse 50. That is, the contour of the base 52 and body 54 may embody the outward physical appearance of the mouse 50. The contour may be rectilinear, curvilinear or both. In one embodiment, a bottom side of the base 52 has an external contour (e.g., rectilinear) that substantially conforms to the contour of a flat surface such as a desktop. In addition, a back portion 58 of the body 54 has an external contour (e.g., curved) that substantially conforms to the contour of the palm-side surface of a hand, and a front portion 60 of the body 54 has an external contour (e.g., curved) that substantially conforms to the contour of the fingers of the hand when the palm side surface of the hand is placed on the back portion 58 of the body 54.

The rotatable disc 56 is configured to provide a control function for the mouse 50 so that a user can perform one or more actions on a display screen. For example, the rotatable disc 56 may provide a control function corresponding to a scrolling feature that allows a user, for example, to move the GUI vertically (up and down), or horizontally (left and right) in order to bring more data into view on the display screen. The rotatable disc 56 is arranged to rotate relative to the body 54. As such, the rotatable disc 56 may be rotated around an axis 57 in order to implement the control function. In most cases, the axis 57 is normal to a plane defined by the external surface of the body 54. As such, the plane of rotation is generally orthogonal to the direction of clicking.

The orientation of the rotatable disc 56 relative to the base 54 may be widely varied. For example, the rotatable disc 56 may be recessed within, protrude above, or be substantially level with the body 54. In the illustrated embodiment, a top surface 64 of the rotatable disc 56 is substantially flush with an external surface 66 of the body 54. As such, the top surface 64, rather than the edge, of the rotatable disc 56 is accesible to the user. Furthermore, the rotatable disc 56 is configured to sit in the body 54. In most cases, the rotatable disc 56 is positioned in a plane that is substantially parallel to a plane defined substantially by the external surface 66 of the body 54 in which the rotatable disc 56 sits (e.g., front portion 60). By having the rotatable disc 56 sit in the surface 66 of the body 54, the user can click on the rotatable disc 56 via force F without actuating the control function of the disc and without having to move their fingers to try and avoid it. As should be appreciated, a user generally needs to apply a rotary motion to the rotatable disc 56 to get it to implement the control function and thus it tends not to implement the control function when the user clicks substantially through its axis 57.

In addition, the rotatable disc 56 may be positioned relative to any portion of the body 54 (e.g., sides, top front, back, etc.). In the illustrated embodiment, the rotatable disc 56 is seated at a front portion 60 of the body 54. Moreover, the rotatable disc may be configured to help define the shape and/or form of the mouse 50. For example, as shown in FIG. 3, the top surface or engageable surface 64 of the rotatable disc 56 is contoured to the shape of the front portion 60 of the body 54. In most cases, the top surface 64 is completely exposed to the user, i.e., the top surface 64 is not covered by a portion of the body 54.

The rotatable disc 56 may also include tactile features 62, which provide tangible surfaces that help the user manipulate the rotatable disc (e.g., allow the user to more easily grip the disk with a finger) and that inform the user of its rotatable position during rotation thereof. The tactile features 62 may be widely varied. For example, the tactile features 62 may be bumps, knurls, recesses, cavities and/or the like. The tactile features 62 should be least obtrusive surface as possible while still allowing the user to grip the disc. In most cases, the tactile features 62 are disposed around the outer periphery of the disc 56. This configuration informs the user where the edge of the rotatable disc 56 is when using the rotatable disc 56. By being at the edge, the user may supply the greatest amount of torque for moving the rotatable disc 56 about the axis 57. The center of the rotatable disc 56 is generally smooth like the rest of the mouse surface, i.e., the external surface of the body. In the illustrated embodiment, the tactile features 62 are bumps that extend above the top surface 64 of the scroll wheel 56. This allows the rotatable disc 56 to be felt by one or more fingers of the user.

Figure 6:
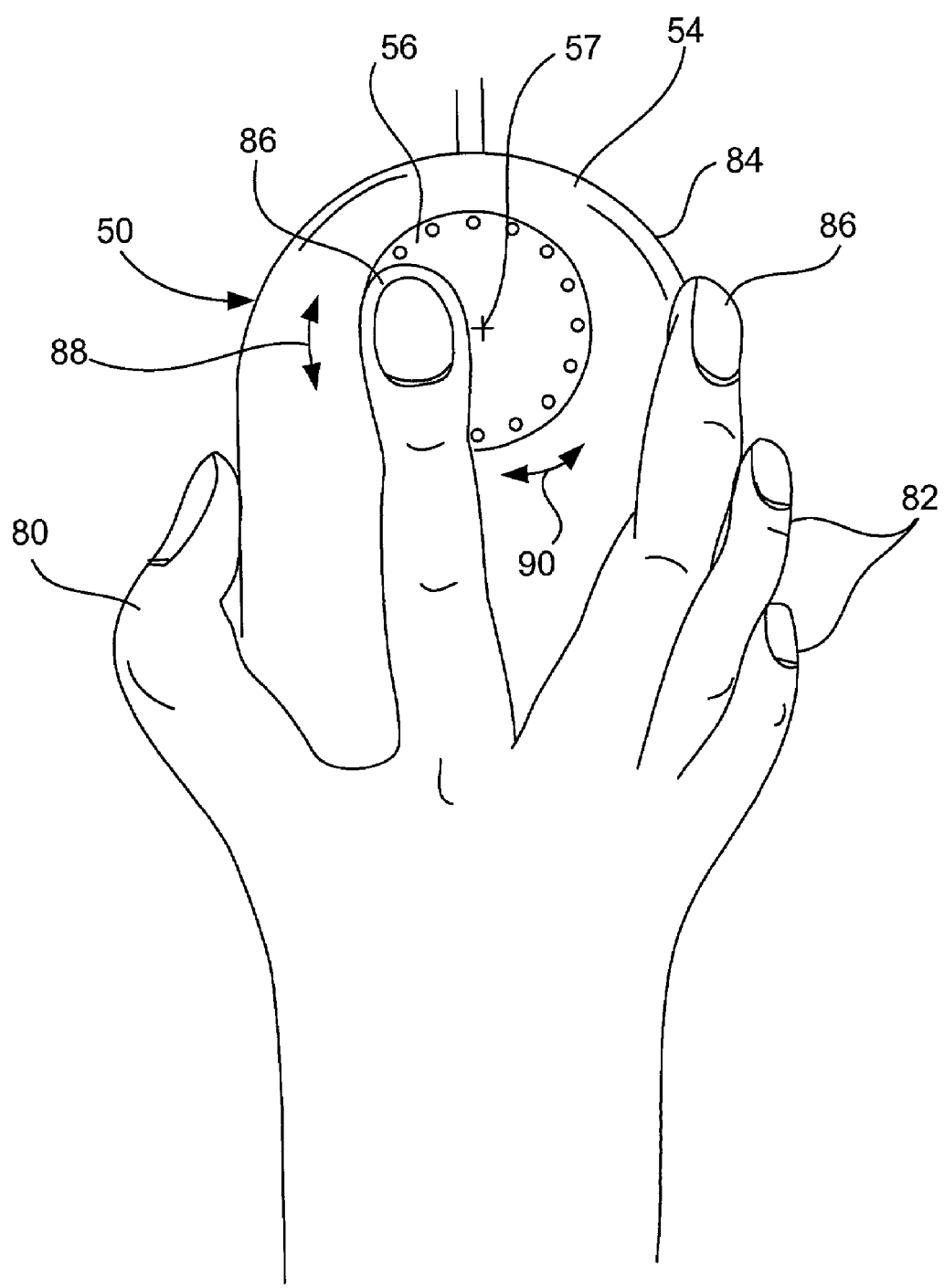
FIG. 6 is an illustration of a mouse being held by the hand of a user, in accordance with one embodiment of the present invention.

Referring to FIG. 6, the entire top surface 54 of the rotatable disc 56 is advantageously accessible to the user's fingers. This configuration generally allows the rotatable disc 56 to be easily manipulated by one or more fingers when the palm side surface of the hand is placed on the back portion 58 of the body 54. For example, the thumb 80 and two rightmost fingers 82 (or leftmost fingers if left handed) are used to grip the sides 84 of the body 54 while the two remaining fingers 86 (either by themselves or in combination) are used to manipulate the rotatable disc 56. As shown, the rotatable disc 56 can be continuously rotated by a simple swirling motion of the finger 86, i.e., the disc 56 can be rotated through 360 degrees of rotation without stopping. In addition, the user can pull or push on the disc tangentially from all sides of the rotatable disc 56. For example, the rotatable disc 56 may be manipulated forwards and backwards as shown by arrows 88 and side to side by arrows 90.

Figure 7:
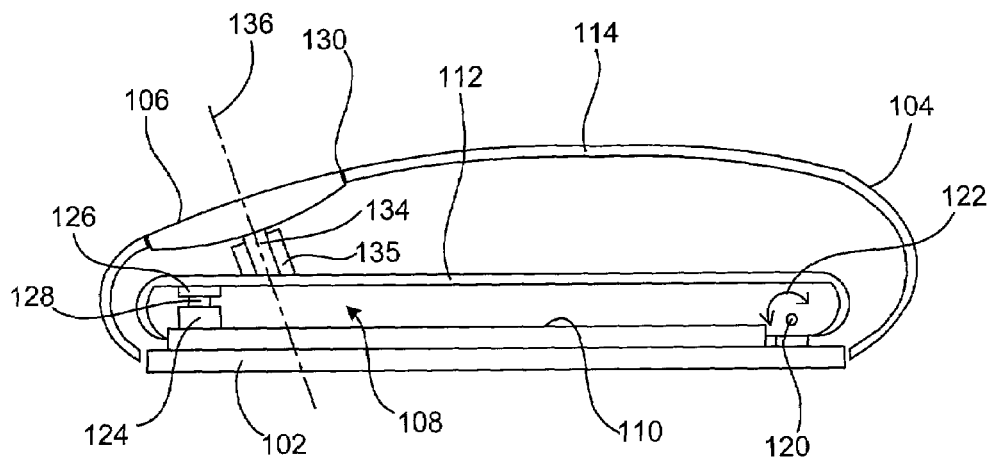
FIG. 7 is a side view, in cross section, of a mouse, in accordance with one embodiment of the present invention.

FIG. 7 is a side elevation view, in cross section, of a mouse 100, in accordance with one embodiment of the present invention. By way of example, the mouse 100 may generally correspond to the mouse 50 shown in FIGS. 2–4, 7 and 8. For example, the mouse 100 generally includes a base 102, a body 104 and a disc 106 that may correspond to the base 52, body 54 and disc 56 of the mouse 50. In general, the base 102 and the body 104 form the housing for the mouse 100. As such, the base 102 and body 104 enclose a plurality of internal components 108, which provide different functions for the mouse 100. These components may be electrical and/or mechanical components. For the sake of clarity, not all of the internal components are shown in FIG. 5. In one embodiment, the electronic components of the mouse 100 are disposed on a printed circuit board (PCB) 110, which is mounted to the base 102.

Broadly, the base 102 provides a platform for sliding the mouse 100 along a surface and for supporting the other components of the mouse 100, as for example, the internal components 108, the body 104 and the disc 106. The body 104, which is pivotally coupled to the base 102, provides a clicking action for selecting and executing actions on the GUI. As should be appreciated, the body 104 is the button of the mouse 100 and therefore the body has no separate mechanical buttons disposed thereon. While the body 104 has no buttons, it does support the disc 106 thereon. The disc 106 is rotatably coupled to the body 104. The disc 106 may provide a scrolling feature. Because the scroll disc 106 is coupled to the body 104, it moves with the body 104 when the body 104 is pivoted with respect to the base 102, i.e., during the clicking action.

More specifically, the body 54 includes an inner shell 112 and an outer shell 114. The outer shell 114 is structurally coupled to the inner shell 112. The means for coupling the outer shell 114 to the inner shell 112 is not shown herein, however, any suitable coupling means may be used. By way of example, the outer shell 114 may be coupled to the inner shell 112 via fasteners such as snaps, screws, glues and the like. Alternatively, the inner and outer shell 112, 114 may be integrally formed from a single piece of material.

The inner and outer shells 112, 114, as well as the base 102, are generally formed from a suitable material such as plastic. In one implementation, the outer shell 114 is formed from a translucent material so that the inner shell 112 may be visible to a user. As shown, the inner shell 112 is disposed between the base 102 and the outer shell 114. As such, the inner shell includes a top surface 116, which substantially faces the inner surface of the outer shell 114 and a bottom surface 118 that substantially faces the base 102. In one embodiment, the inner shell 112 is configured to cover the electronic components disposed on the PCB 110.

The inner shell 112 is pivotally coupled to the base 102 via a pivot 120 located towards the rear of the mouse 100. By way of example, the pivot 120 may include a pivot support attached to the base 102, and the inner shell 112 may include an internal pivot pin for mating with an opening in the pivot support. The pivot 120 allows the body 102 to swing (as shown by arrow 122) between an unclicked position, placing the body 104 away from the base 102, and a clicked position, placing the body 104 towards the base 102. In the clicked position (e.g., when a downward force is applied to the body 102), the inner shell 112 is configured to engage a switch 124, which is mounted on the PCB 110 and which is located opposite the pivot 120. That is, during the clicking action, a bottom portion 126 of the inner shell 112 is pushed against an actuator 128 of the switch 124 thereby activating the switch 124, i.e., the actuator 128 is configured to move between a deactivate position (e.g., upright) and an activate position (e.g., depressed). When activated, a command signal such as a data selection or execution command signal is sent to a computer. By way of example, the signal may be sent through a cable (not shown) that is connected to the internal electronics 108 housed within the mouse 100.

In one embodiment, a spring mechanism is used to bias the inner shell 112 in a direction away from the base 102, i.e., in the un-clicked position (as shown). By way of example, the spring mechanism may be part of the switch 124, i.e., the actuator 128 may be biased in the upright position, or it may be a separate spring pad connected to the base 102.

Referring now to the disc 106, the disc 106 is rotatably coupled to and oriented relative to the body 104. In the illustrated embodiment, the disc 106 is positioned within an opening 130 in the outer shell 114 and is rotatably coupled to the inner shell 112. In particular, the disc 106 is attached to a shaft 134 that rotates within a housing 135 attached to the inner shell 112. The shaft allows the disc 106 to freely rotate about an axis 136. The housing may include bearings so as to provide smoother disc rotation. As shown, the imaginary axis 136 intersects the bottom surface of the mouse (e.g., base 102). In the illustrated embodiment, the housing is structurally coupled the top surface of the inner shell 112. This coupling may be made using suitable methods and techniques. By way of example, the housing may be coupled to the inner shell 112 using fasteners such as glue, screws and the like.

Although the housing is shown attached to the top surface of the inner shell 112, it should be appreciated that this is not a limitation and that other configurations may be used. For example, the housing may be recessed within the inner shell, or it may be positioned on an inner surface of the inner shell. In addition, the houisng may also be connected to the outer shell, which is structurally coupled to the inner shell as described above. Furthermore, a lip or seal may be provided by the outer shell 114 to help support the disc 106 in the outer shell 114 and to eliminate gaps that may allow dirt or dust to penetrate into the mouse 100.

In accordance with one embodiment, the rotation of the disc 106 is measured via an encoder. In most cases, the encoder is activated by rotating the scroll disc 106, and thus the shaft 134, with a finger (index or otherwise). The encoder may be an integral portion of the scroll disc, i.e., the shaft may be included in the encoder or the encoder may be a separate component that is connected to the scroll disc. The encoder may be an optical encoder or a mechanical encoder.

Optical encoders generally operate by interrupting a signal between two sensors. They may also be reflective where the signals are generated by reflecting light (visible or IR) off of a patterned surface. Mechanical encoders generally operate by turning a switch on and off. In either case, the encoder determines what direction the scroll disc 106 is turning and reports the number of counts, i.e., the number of points that are measured in a given rotation (360 degrees). In most cases, the encoder is operatively coupled to a portion of the internal circuitry 108 of the mouse 50. Thus, the scrolling information may be sampled and sent to a host computer by the internal circuitry. The host computer then does what it wants with the scrolling information. For example, signals are sent to the host computer over a cable, and software, converts the number, combination and frequency of the signals into distance, direction and speed necessary to scroll in the GUI.

Any suitable number of counts may be used. In most cases, it would be desirable to increase the number of counts per report so as to provide higher resolution, i.e., more information can be used for things such as acceleration. Unfortunately, however, as the number of counts increases per report, it becomes harder for a human to determine. That is, there is generally a minimum angle that corresponds to human motor function (360/counts=degrees of rotation per count). Therefore, it would be desirable to balance the resolution and the human motor function, i.e., a high resolution that has some benefit to the user. It is generally believed that optical encoders give the user more control over the resolution, i.e., how many counts per rotation.

The mechanical encoder typically includes a disc having a plurality of contact points. The disc may be the bottom of the scroll disc, or another disc positioned on the shaft, as for example, within the housing. The mechanical encoder also includes two pairs of contact bars that are configured to touch the contact points as they pass by during rotation of the scroll disc. An electrical signal is thus produced each time a contact bar passes a contact point. The number of signals indicates how many points the contact bars have touched—the more signals, the more the user rotated the disc. The direction in which the disc is turning, combined with the ratio between the number of signals from the disc indicate the direction and magnitude that the disc is rotating. In most cases, the mechanical contacts are arranged to produce quadrature signals in order to determine both speed and direction of the scroll disc.

The optical encoder typically includes an optical encoding disc having a plurality of slots separated by openings therebetween. The optical encoding disc may be a portion of the scroll disc, or another disc positioned on the shaft. By way of example, referring to FIG. 8A, the disc 106 may include a plurality of slots 140 extending from the bottom of the disc 106 and openings 142 disposed between the slots 140. The optical encoder also includes a light source such as an infrared LED and a light sensor such as an infrared sensor (light sensitive transistor) or photo detector positioned on opposites sides of the optical encoding disc. The slots and openings in the optical encoding disc break the beam of light coming from the light source so as to produce pulses of light that are picked up by the light sensor (as the disc spins around, it chops up or interrupts the light). The rate of pulsing is directly related to the speed of the disc and the distance it travels. In most cases, an on board processor chip reads the pulses from the light sensor and turns the pulses into binary data that the host computer can understand.

Figure 8A:
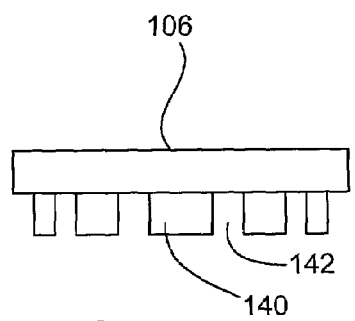
FIG. 8A is a side view of a rotary disc, in accordance with one embodiment of the present invention.
Figure 8B:
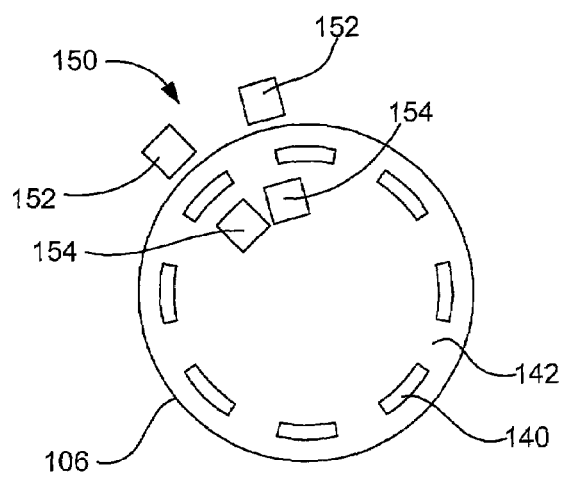
FIG. 8B is a bottom view of a rotary disc, in accordance with one embodiment of the present invention.

The optical encoder generally includes a pair of optical switches that provide quadrature pulses (90 degrees out of phase) as the scroll disc is turned. By providing pulses in quadrature, the optical encoder lets you determine the direction the scroll disc is being turned, as well as its speed. Referring to FIG. 8B, each optical encoder 150 typically has two light sources 152 and two light sensors 154 so as to determine the disks 106 direction and speed of rotation. Broadly, as the disk 106 turns, two signals are generated by the light sources 152, and by looking at which edge occurs first (slots 140), the system can determine the direction of the disc. More particularly, the two groups of light sources and light sensors 152 and 154 are spaced so that when one group sees light through the center of the opening 142, the other group is looking at an edge of the slot 140 and therefore switching on or off.

The encoder, whether mechanical or optical, generally includes a plurality of detents that provide a tactile way for the user to know when the encoder has reached a certain position. The detent may be a mechanical detent that provides a click that gives the user the ability to feel when something is going to happen on the screen. Mechanical detents generally provide a certain amount of torque that must be overcome to rotate the scroll disc. For example, the mechanical detent may include a biased arm that engages a various portions of the scroll disc so as to produce a torque as well as a click. Mechanical detents can be built into an encoder assembly or alternatively into the mouse body. In one embodiment, the number of detents corresponds to the number of counts. In another embodiment, the scroll disc includes the same number of tactile features as detents.

Although not shown, the internal components 108 may include a positional movement detecting mechanism for detecting movement of said mouse 100 so as to produce positional signals that relate to a cursor on the display screen. The detecting mechanism may be a mechanical mechanism such as a trackball or an optical mechanism such as an optical sensor, both of which track the position of the mouse 100. With regards to the track ball mechanism, a portion of the trackball generally protrudes from the underside of the base 102 while the remaining portion is housed within the mouse 100. As should be appreciated, the protruding portion of the trackball touches a flat surface on which the mouse 100 sits, thus causing the trackball to roll when the mouse 100 is moved along the surface.

As the ball moves, it engages two rollers housed within the mouse. One of the rollers is oriented so that it detects motion in a first direction (e.g., X direction), and the other roller is oriented so that it detects motion in a second direction (e.g., Y direction), which is typically at a 90 degree angle relative to the first direction. By way of example, the first direction may relate to back and forth movements of the mouse, and the second direction may relate to side to side movements of the mouse. In most cases, the back and forth movements correspond to vertical movements in the GUI while side to side movements correspond to horizontal movements in the GUI. Each of the rollers is coupled to an encoder through a shaft so that when the rollers turn they spin the shaft and thus the encoders. The encoders may be mechanical encoders or optical encoders. The encoder is configured to generate signals based on the speed, distance and direction of the mouse as it is moved. In one implementation, the signals are processed by a processor chip, which is positioned on the PCB and housed within the mouse. The processor chip is typically configured to turn these signals into binary data, which can be used by a computer. Positional movement detecting mechanisms are generally well known in the art and for the sake of brevity will not be described in any greater detail.

In addition to the above, the mouse 100 generally includes a cable for connection to the computer. One end of the cable is permanently connected to the internal electronics such as the encoders, switches, processor, and the like, and the other end includes a connector for temporarily coupling the mouse to the computer. By way of example, the connector may be a PS/2 connector, a serial connector, a USB port and the like. In some cases, the mouse may include a radio frequency (RF link or optical infrared (IR) link to eliminate the need for a cable.

Figure 9:
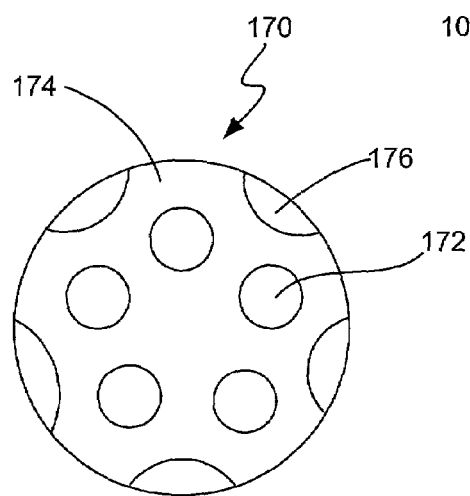
FIG. 9 is a top view of a rotary disc, in accordance with one embodiment of the invention.

FIG. 9 is a top view of a scroll disc 170, in accordance with one embodiment of the invention. The scroll disc 170 may generally correspond to any of the discs described above. The scroll disc 170 includes a plurality of tactile bumps 172 extending from a top surface 174 of the scroll disc 170, and a plurality of divots 176 disposed below the top surface 174 of the scroll disc 170. The bumps and divots may be widely varied. In the illustrated embodiment, the divots 176 are positioned along the periphery of the scroll disc 170 and the bumps 172 are disposed towards the center of the scroll disc 170.

Figure 10:
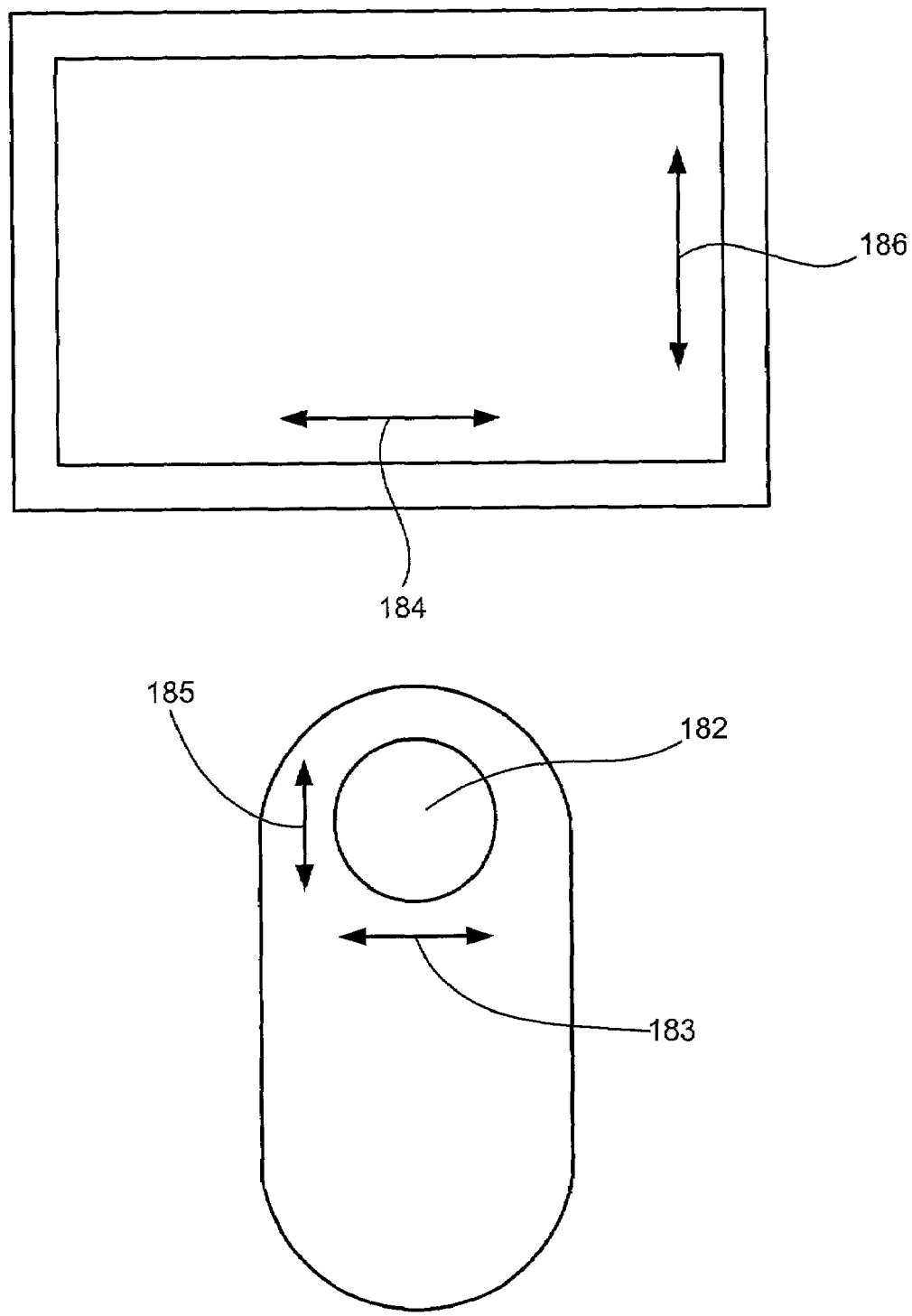
FIG. 10 is a diagram showing the interaction of the mouse with a GUI interface on a display screen, in accordance with one embodiment of the present invention.

The advantages of the invention are numerous. Different embodiments or implementations may have one or more of the following advantages. One advantage of the mouse is that a substantial portion of the rotary disc is accessible to the user, i.e., the rotary disc provides a large surface area for manipulation thereof. Another advantage of the mouse is that the rotary disc can be continuously rotated by a simple swirling motion of a finger, i.e., the disc can be rotated through 360 degrees of rotation without stopping. Another advantage of the mouse is that the user can rotate the disc tangentially from all sides thus giving it more range of finger positions than that of a traditional vertical wheel (FIG. 1). For example, a left handed user may choose to use one portion of the disc while a right handed user may choose to use another portion of the disc. In essence, the mouse is more ergonomic. Another advantage of the mouse is that the rotary disc does not protrude out of the mouse thus reducing the amount of accidental scrolling while making the mouse more aesthetically pleasing. Another advantage is that the mouse allows an intuitive way to scroll on a display screen. For example, as shown in FIG. 10, the user can manipulate the disc 182 side to side as shown by arrows 183 for horizontal scrolling 184 and the user can manipulate the disc 182 backwards and forwards as shown by arrows 185 for vertical scrolling 186. Another advantage of the invention is that pressing down on the disc for clicking does not cause the disc to rotate, i.e., since the motion of the disc is orthogonal to the direction of clicking (button press) the user can press on the disc itself to activate the button.

While this invention has been described in terms of several preferred embodiments, there are alterations, permutations, and equivalents, which fall within the scope of this invention. Although a scrolling feature is described throughout this document, it should be noted that a scrolling feature is not a limitation and that the rotary dial may be used to manipulate other features. For example, the rotary dial may be used to adjust a volume control in an audio application. In addition, the rotary dial may be used to advance through frames in a movie in video editing applications. The rotary dial may also be used in video game applications. Furthermore, although a conventional button as shown in FIG. 1 is not described in combination with a scroll disc, it should be noted that the scroll disc and conventional buttons may be used together on a single mouse. It should also be noted that there are many alternative ways of implementing the methods and apparatuses of the present invention. For example, although in most cases the default of the scroll disc would correspond to vertical scrolling, in software, the cursor may be moved to the horizontal scroll bar on the screen to actuate horizontal scrolling. It is therefore intended that the following appended claims be interpreted as including all such alterations, permutations, and equivalents as fall within the true spirit and scope of the present invention.

What is claimed is:

1. A computer mouse, comprising a housing and a rotary dial positioned to take up a portion of the front of an external surface of the housing, the housing providing a platform for sliding the mouse along a surface in order to move a cursor or pointer on a display screen of a computer system, the rotary dial rotating around an axis in order to implement a control function in the computer system, the rotary dial rotating within a plane that is substantially parallel to the external surface of the housing, the rotary dial having an engageable face for allowing a user to facilitate rotation of the rotary dial, the engageable face being completely exposed to the user, the mouse housing serving as a button of the computer mouse and providing a clicking action for performing an action with respect to the computer system, wherein the mouse housing has no separate mechanical buttons disposed thereon.

2. The computer mouse as recited in claim 1 wherein the control function is associated with performing an action on a display screen.

3. The computer mouse as recited in claim 2 wherein the control function corresponds to a scrolling feature.

4. The computer mouse as recited in claim 1 wherein the control function is used to control various applications associated with a computer system.

5. The computer mouse as recited in claim 1 wherein the engageable face is substantially parallel to the external surface of the housing.

6. The computer mouse as recited in claim 1 wherein the rotary dial is tangentially accessible to a user from the entire circumference of the rotary dial.

7. The computer mouse as recited in claim 1 wherein the engageable face of the rotaty dial is substantially flush with the external surface of the housing.

8. The mouse as recited in claim 1 wherein the housing has no mechanical buttons disposed thereon.

9. A mouse for moving a cursor or pointer on a display screen, comprising:
a mouse housing; and
a disk coupled to the mouse housing and rotatable about an axis that is normal to an external surface of the mouse housing, the disk being configured to facilitate a control function on the display screen, the disk being positioned to take up a portion of the front of an external surface of the mouse housing, the disk having a touchable surface for rotating the disk about the axis, the touchable surface being completely accessible to a finger of the user such that the disk can be continuously rotated by a simple swirling motion of the finger, wherein the mouse housing serves as a button of the computer mouse and provides a clicking action for performing an action with respect to a computer system, wherein the mouse housing has no separate mechanical buttons disposed thereon.

10. The mouse as recited in claim 9 wherein the control function is associated with performing an action on the display screen.

11. The mouse as recited in claim 10 wherein the control function corresponds to a scrolling feature.

12. The mouse as recited in claim 11 wherein the scrolling feature allows a user to move displayed data across a viewing area on the display screen so that a new set of displayed data is brought into view in the viewing area.

13. The mouse as recited in claim 12 wherein the rotation of the disk causes the displayed data to move across the viewing area of the display screen.

14. The mouse as recited in claim 13 wherein the displayed data is moved vertically or horizontally on the display screen.

15. The mouse as recited in claim 14 wherein side to side rotation of the disk about the axis corresponds to horizontal scrolling, and wherein forwards and backwards rotation of the disk about the axis corresponds to vertical scrolling.

16. A computer mouse, comprising:
a mouse housing that provides a structure for moving the computer mouse along a surface and for gripping the mouse for movement thereof;
a position detection mechanism operatively supported by the mouse housing, the position detection mechanism being configured for tracking the position of the mouse as its moved along the surface;
a disk positioned relative to an external surface of the mouse housing, the disk being rotatably coupled to the mouse housing about an axis that is normal to the external surface of the mouse housing, the disk being positioned to take up a portion of the front of an external surface of the housing, the disk having a user input receiving surface for facilitating movements thereof about the axis, and
an encoder for monitoring the rotation of the disk about the axis wherein the mouse housing serves as a button of the computer mouse and provides a clicking action for performing an action with respect to a computer system wherein the mouse housing has no separate mechanical buttons disposed thereon.

17. The computer mouse as recited in claim 16 wherein a substantial portion of the user input receiving surface is exposed outside of the mouse housing.

18. The computer mouse as recited in claim 16 wherein the user input receiving surface is completely accessible to a finger of the user.

19. The computer mouse as recited in claim 18 wherein the control function corresponds to a scrolling feature.

20. The computer mouse as recited in claim 16 wherein the disk is configured to facilitate a control function.

21. The computer mouse as recited in claim 16 wherein the external surface corresponds to a top of the mouse housing.

22. The computer mouse as recited in claim 16 wherein the external surface corresponds to a side of the mouse housing.

23. The computer mouse as recited in claim 16 wherein the user input receiving surface of the disk is substantially flush with a top external surface of the mouse housing.

24. The computer mouse as recited in claim 16 wherein the plane of rotation of the disk is parallel to a top external surface of the mouse housing.

25. The computer mouse as recited in claim 16 wherein the user input receiving surface is substantially perpendicular to the axis and wherein the disk includes tactile elements for increasing the feel of the disk, the tactile elements including bumps extending from the user input receiving surface or voids representing removed sections of the user input receiving surface.

26. The computer mouse as recited in claim 16 wherein the encoder is an optical encoder.

27. The computer mouse as recited in claim 26 wherein the disk is attached to a shaft that rotates within a shaft housing attached to the mouse housing and wherein the optical encoder includes a light source, a light sensor and an optical encoding disc having a plurality of slots separated by openings therebetween, the slots and openings breaking the beam of light coming from the light source so as to produce pulses of light that are picked up by the light sensor, the optical encoding disc being an integral part of the disk or a separate portion that is attached to the shaft.

28. The computer mouse as recited in claim 16 wherein the clicking action is actuated in a direction normal to the mouse housing.

29. The computer mouse as recited in claim 16 further including a button for allowing a user to make a selection on the display.

30. The computer mouse as recited in claim 16 wherein the disk is configured to sit in the mouse housing.

31. The computer mouse as recited in claim 16 wherein the top surface of the disk is level with the external surface of the mouse housing.

32. The computer mouse as recited in claim 16 wherein the encoder includes a plurality of detents that provide tactile feedback that informs the user when the disk has reached a certain position.

33. The computer mouse as recited in claim 16 wherein the mouse housing includes a front portion and a back portion, wherein the disk is seated in the front portion of the mouse housing, and wherein the front portion of the mouse housing has no mechanical buttons.

34. The computer mouse as recited in claim 16 wherein the encoder is a mechanical encoder.

35. The computer mouse as recited in claim 16 wherein the top surface of the disk is recessed below the external surface of the mouse housing.

36. The computer mouse as recited in claim 16 wherein the top surface of the disk is extends above the external surface of the mouse housing.

37. The mouse as recited in claim 16 wherein the mouse housing includes a base coupled to a body, the base being configured to make moving contact with the surface when the computer mouse is moved by the user, the body being configured to pivot relative to the base in order to generate the clicking action, the body being pivotally coupled to the base via a pivot located towards the rear of the mouse, the pivot allowing the button body to swing forward between an unclicked position, placing the body away from the base, and a clicked position placing the body towards the base.

38. A computer mouse, comprising:
a mouse housing that provides a structure for moving the computer mouse along a surface and for gripping the mouse for movement thereof, the mouse housing serves as a button, the mouse housing providing a clicking action for performing an action on a display screen, the clicking action is actuated in a direction normal to the mouse housing, the mouse housing includes a base coupled to a body, the base being configured to make moving contact with the surface when the computer mouse is moved by the user, the body being configured to pivot relative to the base in order to generate the clicking action;
a position detection mechanism operatively supported by the mouse housing, the position detection mechanism being configured for tracking the position of the mouse as its moved along the surface;
a disk positioned relative to an external surface of the mouse housing, the disk being rotatably coupled to the mouse housing about an axis that is normal to the external surface of the mouse housing, the disk having a user input receiving surface for facilitating movements thereof about the axis, the plane of rotation of the disk being substantially orthogonal to the direction of the clicking action; and an encoder for monitoring the rotation of the disk about the axis.

39. The computer mouse as recited in claim 38 wherein the axis is obliquely positioned relative to the base.

40. A computer mouse, comprising a housing and a rotary dial positioned relative to an external surface of the housing, the housing providing a platform for sliding the mouse along a surface in order to move a cursor or pointer on a display screen of a computer system, the housing of the mouse including a base and a button body that cooperate to contain the electronics of the mouse, the rotary dial rotating around an axis in order to implement a control function in the computer system, the rotary dial rotating within a plane that is substantially parallel to the external surface of the housing, the rotary dial having an engageable face for allowing a user to facilitate rotation of the rotary dial, the engageable face being completely exposed to the user, the rotary dial being rotatably coupled to the button body, the button body moving relative to the base in order to generate a clicking action for selecting and executing actions on a graphical user interface, the rotary dial moving with the button body when it is moved relative to the base.

41. The mouse as recited in claim 40 wherein a back portion of the button body has an external contour that substantially conforms to the contour of the palm side surface of the hand, wherein a front portion of the button body has an external contour that substantially conforms to the contour of the fingers of the hand when the palm side surface of the hand is placed on the back portion of the button body, and wherein the rotary dial is located at the front portion of the button body so that the fingers of the hand can easily manipulate the rotary dial when the palm side surface of the hand is placed on the back portion of the button body and the fingers of the hand are placed on the front portion of the button body.

42. The mouse as recited in claim 40 wherein the button body is pivotally coupled to the base.

43. The mouse as recited in claim 42 wherein the button body is pivotally coupled to the base via a pivot located towards the rear of the mouse, the pivot allowing the button body to swing between an unclicked position, placing the body away from the base, and a clicked position placing the body towards the base.

44. The mouse as recited in claim 43 wherein the button body engages a switch located inside the housing and opposite the pivot when the button body is moved to the clicked position, the switch generating a command signal when the button body engages the switch.

45. The mouse as recited in claim 43 wherein the pivot includes a pivot support attached to the base, and a pivot pin attached to the button body, the pivot pin mating with an opening in the pivot support in order to pivotally couple the button body to the base.

46. The mouse as recited in claim 43 further including a spring mechanism for biasing the button body in the unclicked position.

47. The mouse as recited in claim 43 wherein the button body includes an inner shell and an outer shell, the inner shell being disposed between the base and the outer shell, the outer shell forming the exterior surface of the mouse, the inner shell covering electronic components disposed inside the mouse, the pivot including a pivot support attached to the base and an internal pivot pin attached to the inner shell, the pivot pm mating with an opening in the pivot support in order to pivotally couple the button body to the base.

48. The mouse as recited in claim 47 wherein the rotary dial is positioned within an opening in the outer shell and rotatably coupled to the inner shell, the rotary dial having a shaft that rotates within a shaft housing attached to the inner shell.

\* \* \* \* \*

UNITED STATES PATENT AND TRADEMARK OFFICE
CERTIFICATE OF CORRECTION

PATENT NO.         : 7,084,856 B2
APPLICATION NO. : 10/072765
DATED                 : August 1, 2006
INVENTOR(S)       : Brian Huppi It is certified that error appears in the above-identified patent and that said Letters Patent is hereby corrected as shown below:

In the Title Page:

In the "U.S. Patent Documents" section, Item (56) add the following patent documents:

| | | |
|---|---|---|
| -- 2001/0051046 | 12/2001 | Watanable, et al. |
| 2002/0089545 | 07/2002 | Montalcini |
| 5,561,445 | 10/1996 | Miwa et al. |
| 6,256,011 | 07/2001 | Culver |
| 6,650,975 | 11/2003 | Ruffner |
| 4,264,903 | 04/1981 | Bigelow |
| D454,568 | 03/1992 | Andre |
| 5,613,137 | 03/1997 | Bertram et al. |
| 5,777,605 | 07/1998 | Yoshinobu et al. |
| 6,000,000 | 12/1999 | Hawkins et al. |
| 6,750,803 | 06/2004 | Yates et al. |
| 6,978,127 | 12/2005 | Bulthuis et al.-- |

In the "Foreign Patent Documents" section, add the following patent documents:

| | | |
|---|---|---|
| -- DE | 10022537 | 11/2000 |
| DE | 19722636 | 12/199 |
| JP | 07-319001 | 12/1995-- |

UNITED STATES PATENT AND TRADEMARK OFFICE
CERTIFICATE OF CORRECTION

PATENT NO. : 7,084,856 B2
APPLICATION NO. : 10/072765
DATED : August 1, 2006
INVENTOR(S) : Brian Huppi It is certified that error appears in the above-identified patent and that said Letters Patent is hereby corrected as shown below:

In the "Other Publications" section, add the following patent documents:

-- U.S. Patent Application No. 10/209,537 filed July 30, 2002.
  U.S. Patent Application No. 10/060,712 filed January 29, 2002.
  "Apple Unveils Optical Mouse and New Pro Keyboard," Press Release, July 19, 2000.--

Signed and Sealed this

Fourteenth Day of August, 2007

JON W. DUDAS
*Director of the United States Patent and Trademark Office*